United States Patent [19]

Hesseltine

[11] Patent Number: 4,969,275

[45] Date of Patent: Nov. 13, 1990

[54] METHOD AND MEANS FOR MEASURING PLATE STRUCTURES

[76] Inventor: Dennis R. Hesseltine, 1800 Grand Ave., Apt. #235, West Des Moines, Iowa 50265

[21] Appl. No.: 482,031

[22] Filed: Feb. 20, 1990

[51] Int. Cl.$^5$ .............................................. G01B 5/08
[52] U.S. Cl. ..................................... 33/803; 33/549; 33/783
[58] Field of Search ...... 33/1 AA, 430, 700, 706–708, 33/712, 783, 784, 803, 804, 805, 501, 549, 501.6, 121, 573

[56] References Cited

U.S. PATENT DOCUMENTS

| | | | |
|---|---|---|---|
| 1,488,818 | 4/1924 | Johansson et al. | 33/549 |
| 1,671,737 | 5/1928 | Norton | 33/501.02 |
| 3,978,589 | 9/1976 | Courtepatte | 33/803 X |
| 4,208,796 | 6/1980 | Michaud . | |
| 4,366,623 | 1/1983 | Bergqvist . | |

OTHER PUBLICATIONS

Precision Measuring Table—Lee Machine & Mfg. Inc.

*Primary Examiner*—Harry N. Haroian
*Attorney, Agent, or Firm*—Zarley, McKee, Thomte, Voorhees & Sease

[57] ABSTRACT

The apparatus of this invention comprises parallel table surface portions with an elongated slot therebetween. A carriage mean is mounted below the two table surfaces and has an upstanding pin extending therefrom and extending into the slot and slightly above the table surface. A spring extending from a support arm through which the pin extends and a washer affixed to the pin normally causes the pin to be in its uppermost protruding position. A lever is affixed to the lower end of the pin to compress the spring to cause the pin to retract within the slot. An elongated straight gauge member extneds across the table surface portions to serve as a measuring reference point. The method of this invention comprises the steps of withdrawing the pin from its protruding position, laying the plate to be measured on the table surface, moving the retracted pin within the elongated slot to the measuring position whether that be from an aperture in the plate or the opposite end of the plate, extending the pin either into the aperture or adjacent the far end of the plate, actuating the measuring device, and then if necessary, retracting the pin and moving it to a second measuring position.

6 Claims, 2 Drawing Sheets

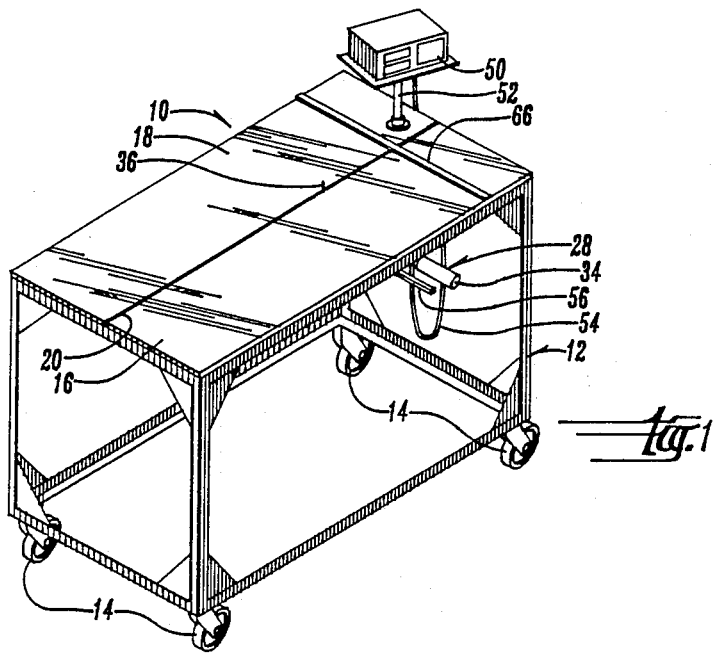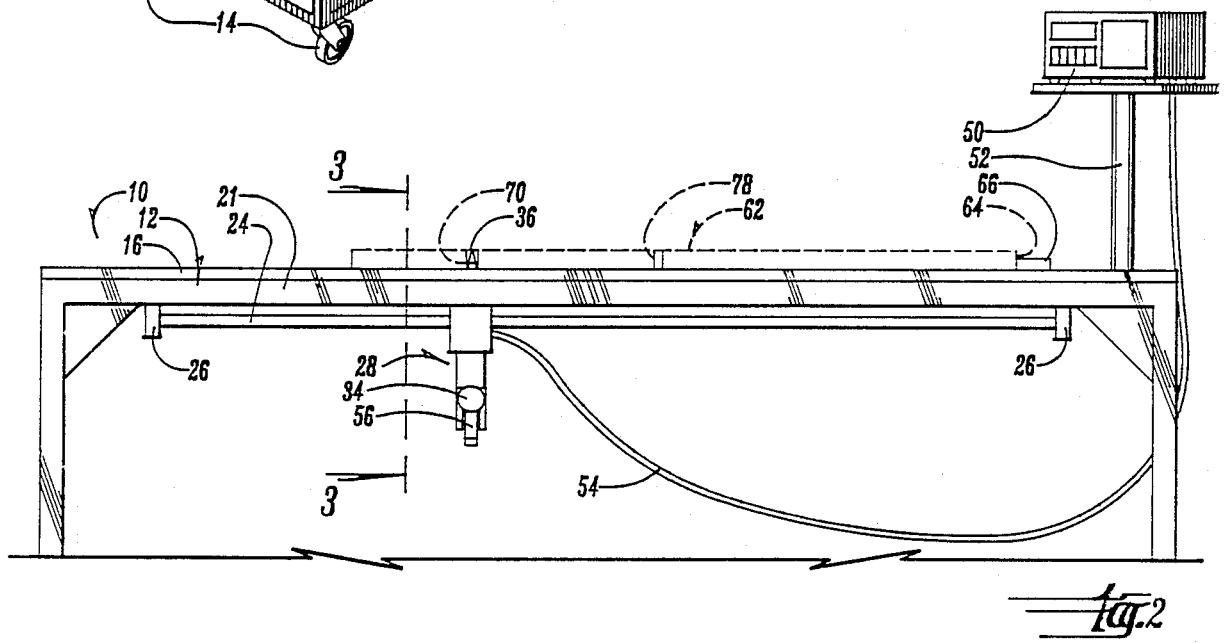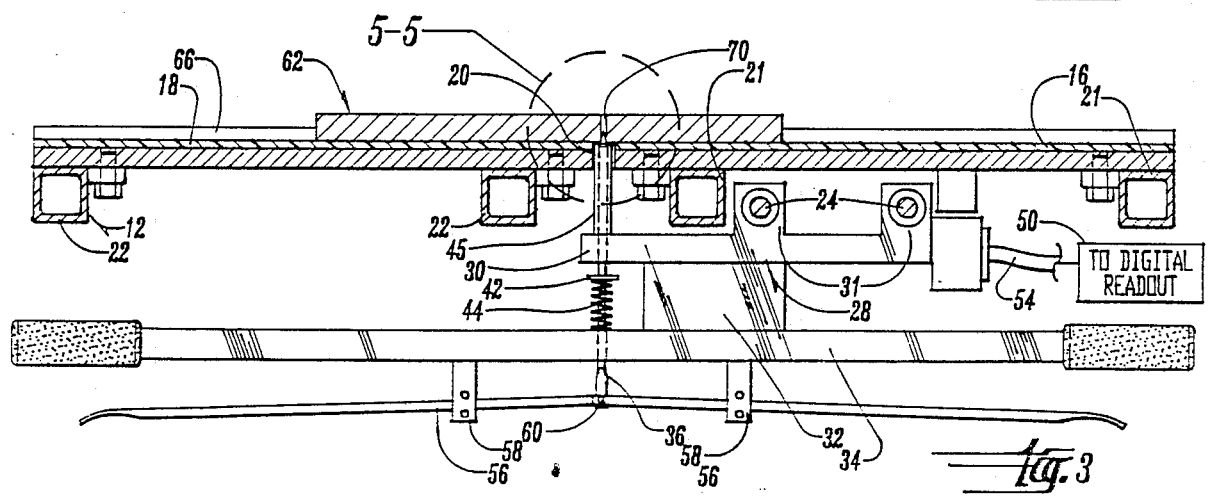

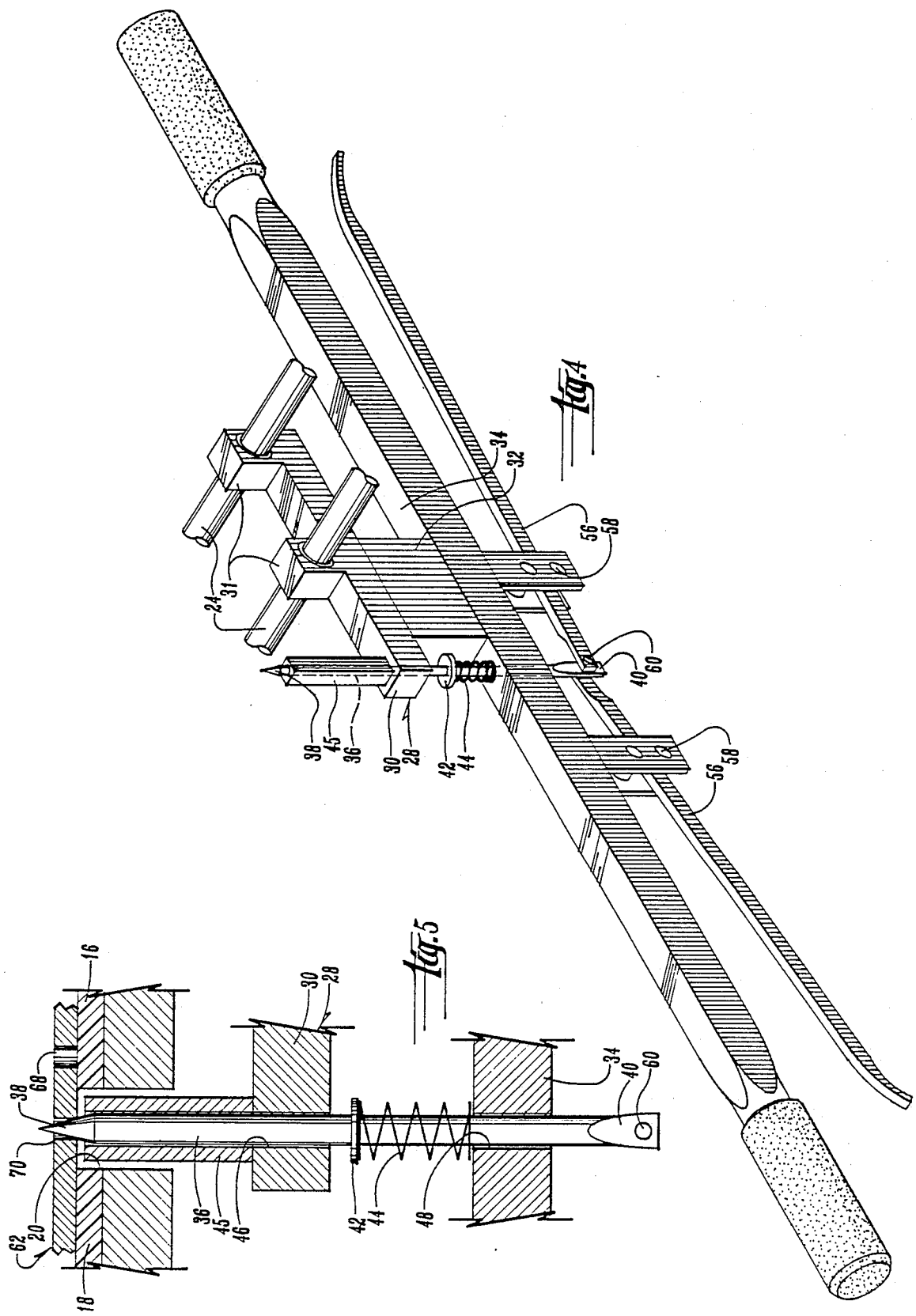

METHOD AND MEANS FOR MEASURING PLATE STRUCTURES

BACKGROUND OF THE INVENTION

Sheet metal and other structural plate products are conventionally cut to size, and apertures in the plate are punched or otherwise created according to predetermined design considerations.

Quality control requires that the finished plates be remeasured to confirm the accuracy of their length, width, and the precise location of the apertures.

Heretofore, it has been a practice in such quality control operations to utilize a table surface having an elongated slot extending at right angles from a straight gauge means. A movable protruding pin rides in the slot from a movable carriage. A suitable electronic measuring device is associated with the pin and a digital display.

A plate having a straight edge is abutted against the straight stop after the pin has been moved longitudinally in the slot to provide space between the pin and the stop to permit the plate to rest on the table surface. By bringing the pin to the edge of the plate opposite to the stop, and actuating the measuring device, the precise length of the plate can be confirmed.

If there are one or more apertures in the plate that need to have their locations verified, the plate is tilted upward so that the pin can be moved longitudinally in the slot to ultimately be in a position to penetrate the aperture being measured when the plate is again laid flat on the table surface. Having to move the pin while the plate is laying on the table surface consumes unnecessary time and adds to the labor of the measuring device.

Therefore, it is a principal object of this invention to have a selectively retractable pin in the slot of such a measuring table so that the pin can be moved from position to position in a retracted condition even when a plate is resting on the top supporting surface of the measuring table.

It is a further object of this invention to utilize such a retractable pin in a measuring table whereby the pin can be easily retracted by the operator These and other objects will be apparent to those skilled in the art.

BRIEF SUMMARY OF THE INVENTION

The apparatus of this invention comprises parallel table surface portions with an elongated slot therebetween. A carriage means is mounted below the two table surfaces and has an upstanding pin extending therefrom and extending into the slot and slightly above the table surface. A spring extending from a support arm through which the pin extends and a washer affixed to the pin normally causes the pin to be in it's uppermost protruding position. A lever is affixed to the lower end of the pin to compress the spring to cause the pin to retract within the slot.

An elongated straight gauge member extends across the table surface portions to serve as a measuring reference point.

The method of this invention comprises the steps of withdrawing the pin from it's protruding position, laying the plate to be measured on the table surface, moving the retracted pin within the elongated slot to the measuring position whether that be from an aperture in the plate or the opposite end of the plate, extending the pin either into the aperture or adjacent the far end of the plate, actuating the measuring device, and then if necessary, retracting the pin and moving it to a second measuring position.

BRIEF DESCRIPTION OF THE DRAWINGS

FIG. 1 is a perspective view of the device of this invention;

FIG. 2 is a partial side elevational view thereof shown at an enlarged scale;

FIG. 3 is a transverse sectional view through the table shown at an enlarged scale;

FIG. 4 is an enlarged scale perspective view of the measuring pin, the carriage device, the transport arms, and the lever control arms; and FIG. 5 is an enlarged scale sectional view taken on line 5—5 of FIG. 3.

DESCRIPTION OF THE PREFERRED EMBODIMENT

The numeral 10 designates the measuring table of this invention. A rectangular frame 12 is supported by wheels 14. Rectangular table surfaces 16 and 18 are mounted on frame 12 and have an elongated slot 20 extending therebetween. Table surface 16 is supported on frame members 21 (FIG. 3) and table surface 16 is supported on frame member 22.

Parallel guide rods 24 are supported at their ends by brackets 26 which are secured to the underneath side of table surface 18. A carriage 28 having a laterally extending arm 30 has upstanding bearing blocks 31 which slidably receive the guide rods 24. Bracket 32 extends downwardly from carriage 28 and is rigidly secured to a laterally extending transport arm 34.

An elongated vertical pin 36 has a tapered upper end 38 and a lower end 40. A washer 42 is welded to the substantial mid point of pin 36, and a spring 44 laterally slidably embraces pin 36 below washer 42. A sleeve 45 has a suitable bore to slidably receive pin 36. Sleeve 45 is welded or otherwise secured by it's lower end to the outer upper end of arm 30. The pin extends downwardly through sleeve 45 and through aperture 46 in arm 30, and thence through aperture 48 in transport arm 34.

A conventional measuring apparatus and digital display 50 is mounted on support 52, and is connected to carriage 28 and pin 38 in conventional fashion by power cable 54. As will be explained more fully hereafter, the details of the measuring apparatus are conventional in the art and do not alone comprise this invention.

Withdrawal levers 56 extend laterally outwardly underneath transport arm 34 and extend through pivots 58 which are mounted on the lower surface of the transport arm. Pin 60 pivotally connects the inner ends of levers 56 to the lower end of the pin 36.

A plate 62 having at least one straight edge 64 is laid on the surface of members 16 and 18 with the straight edge 64 abutting the straight gauge or stops 66. A typical plate 62 may have first and second apertures 68 and 70, respectively, and a straight edge 72 opposite to straight edge 64.

It should be understood that all of the aforementioned structures except the retractable pin 36, the means for retracting the pin, and the methodology utilizing the retractable pin, is old and is prior art to this invention. This invention comprises the concept of using the retractable pin as well as the structure pertaining to the retractable phenomenon, and the methodology whereby the retractable pin is utilized in the measuring operation.

It should be noted that the spring 44 normally forces the pin upwardly until the washer 42 abuts the lower surface of arm 30. In this position, pin 36 protrudes above the surface of the table surfaces 16 and 18, as best shown in FIGS. 2 and 5.

In the normal operation of this invention, the operator grasps one of the handles on the transport arm 30 and moves the carriage 28 to a position to the far left as shown in FIG. 2. Usually, sheet metal plates are used on this type of apparatus. However, structural plates can also be utilized. In the drawings, the thickness of the plates has been exaggerated to more fully illustrate the invention.

After the carriage has been moved to the far left, as explained above, a plate 62 is placed on the table surface. A straight edge 64 of the plate is abutted against stop 66. If it is desired to confirm the length of the plate, the carriage is moved to the right as seen in FIG. 2 so that pin 36 abuts the edge 72 of the plate The measuring apparatus 50 is then actuated and the digital display visually reveals the measured length of the plate. The measuring apparatus takes into account that the distance measured is the length of the plate between the stop 66 and the cylindrical surface of the pin 36.

When it is desired to confirm the location of an aperture, one of the levers 56 is raised at it's outer end to cause the other end of the lever to pivot downwardly about one of the pivot points 58. This compresses spring 44 and withdraws or retracts the pin 32 from it's protruding position above the surface of members 16 and 18. The operator then moves the carriage 22 by grasping the transport bar 34 to a position in substantial longitudinal alignment with the position of the aperture in the plate. FIG. 5 shows the pin 32 in alignment with aperture 68. The plate may have to be moved laterally to bring the aperture in alignment with the longitudinal position of the pin. When this has been done, the lever 56 is released, and the pin protrudes into the aperture. The diameter of the aperture must not be greater than the total diameter of the pin 32. However, the tapered upper end of pin 38 can permit the measurement of apertures having a smaller diameter than the pin.

When the pin penetrates the aperture 68, the measuring device 50 is actuated and the distance between the center of the aperture and the stop 66 is visually displayed on the digital display 50. The operator knows in advance what the dimension is supposed to read, and it can be visually determined whether or not the aperture is properly positioned by viewing the visual display.

If the position of a second aperture is to be verified, the pin 32 is withdrawn from the first aperture 68 in the manner described, and the carriage and pin are then moved to the longitudinal location of the second aperture 70. If necessary, the plate is moved laterally so that the aperture 70 is positioned over the pin 32. The pin 32 is then allowed to penetrate the second aperture 70. The measuring apparatus 50 is actuated. Depending on the program in the measuring device, the distance between the aperture 68 and 70 will be displayed, or the distance between the stop 66 and the second aperture is displayed. The operator will know which dimension is actually being measured, and can visually determine the accuracy of the position of the second aperture by viewing the digital display.

It is thus seen that the retractable pin 32 speeds the measuring operation and facilitates the labor involved in completing the measuring operation. This invention therefore accomplishes all of it's stated objectives.

I claim:

1. A measuring device for fabricated plate structures, comprising,
    a flat table surface means, having opposite sides and ends,
    a support means for such flat table surface means,
    a straight reference gauge means adjacent one end of said table surface means, and extending across said table surface means at right angles to said sides,
    an elongated straight slot in said table surface means extending in a direction at right angles to said gauge means,
    a carriage means movably mounted below said table surface, and adapted to be moved in a direction parallel to said slot,
    a measuring reference pin on said carriage and extending upwardly through said slot and having an upper end normally terminating above said table surface,
    retracting means on said carriage for selectively withdrawing said pin downwardly into said slot to permit said pin to be moved longitudinally in said slot when a plate structure is positioned on said table surface over slot,
    and measuring means operative with the location of said pin and said gauge means to measure the linear distance between the location of said pin with respect to said gauge means so that measurements relating to the location of apertures in a plate structure with reference to one end of said plate abutted against gauge means can be determined while said pin is in it's upper position and penetrating an aperture in said plate structure.

2. The device of claim 1 wherein said carriage means is mounted on a pair of parallel guides which are parallel to said slot, an arm extending from said carriage means and extending below said slot, a sleeve extending upwardly from said arm into said slot, said pin having a tapered upper end and a lower end with its upper end slidably mounted within said sleeve, and spring means associated with said pin normally urging said pin to protrude upwardly and outwardly from said sleeve to a level above said table surface, said retracting means secured to the lower end of said pin.

3. The device of claim 2 wherein said retracting means includes at least one horizontally disposed lever secured to the lower end of said pin and extending outwardly over a pivot point towards a position below a side edge of said table surface.

4. The device of claim 1 wherein said measuring means includes a digital readout display means.

5. The method of measuring the distance between an aperture in a plate and a fixed reference point, comprising,
    providing a table surface having a straight gauge means and an elongated slot extending at right angles to said gauge means, with a retractable pin extending upwardly through said slot above said table surface, and withdrawing said pin into said slot,
    laying the plate having at least a first aperture and one straight edge on said table surface with said straight edge abutted against said straight gauge means, positioning said first aperture over said slot,
    moving said plate means so that said first aperture is aligned with said slot, moving said withdrawn pin along said slot towards said first aperture,
inserting said pin into said first aperture, and
actuating a measuring means to determine the distance from said gauge means to the center of said first aperture.

6. The method of claim 5 wherein said plate has a second aperture, withdrawing said pin from said first aperture, moving said plate so that said second aperture is aligned with said slot, moving said withdrawn pin along said slot to said second aperture, inserting said pin into said second aperture, and actuating said measuring means to measure the relative distance between the centers of said apertures.

* * * * *